(12) United States Patent
Namou et al.

(10) Patent No.: US 9,802,558 B2
(45) Date of Patent: Oct. 31, 2017

(54) DISTRIBUTED VEHICLE BATTERY HIGH-VOLTAGE BUS SYSTEMS AND METHODS

(71) Applicant: GM GLOBAL TECHNOLOGY OPERATIONS LLC, Detroit, MI (US)

(72) Inventors: Andrew J. Namou, West Bloomfield, MI (US); Marc Reischmann, Wöllstein (DE); Marjorie A. Bassham, Burton, MI (US); David J. Mifsud, Novi, MI (US); James E. Tarchinski, Rochester Hills, MI (US); Russell K. Steele, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1023 days.

(21) Appl. No.: 14/040,355

(22) Filed: Sep. 27, 2013

(65) Prior Publication Data

US 2015/0091377 A1 Apr. 2, 2015

(51) Int. Cl.
*B60R 16/03* (2006.01)
*B60L 11/18* (2006.01)
(Continued)

(52) U.S. Cl.
CPC ............. *B60R 16/03* (2013.01); *B60L 1/00* (2013.01); *B60L 3/0046* (2013.01); *B60L 3/04* (2013.01); *B60L 11/1851* (2013.01); *B60L 11/1861* (2013.01); *B60L 11/1875* (2013.01); *H01M 2/206* (2013.01); *H02J 7/0063* (2013.01);
(Continued)

(58) Field of Classification Search
CPC .................................. H01M 2/206; B60L 1/00
See application file for complete search history.

(56) References Cited

U.S. PATENT DOCUMENTS

| 8,497,031 B2 * | 7/2013 | Reischmann | ....... B60L 11/1875 320/121 |
| 2009/0167197 A1 * | 7/2009 | Wang | ................. H05B 33/0815 315/185 R |

(Continued)

FOREIGN PATENT DOCUMENTS

| CN | 202633778 U | * 12/2012 | ............... H02B 1/46 |
| CN | 202633778 U | 12/2012 | |

(Continued)

OTHER PUBLICATIONS

CN202633778U—Machine Translation of Application.
CN203032410U—Machine Translation of Application.

*Primary Examiner* — Thienvu Tran
*Assistant Examiner* — Pinping Sun
(74) *Attorney, Agent, or Firm* — Phillips Ryther & Winchester; John P. Davis

(57) ABSTRACT

Systems and methods disclosed herein provide for a distributed high-voltage bus for a battery system included in a vehicle. In certain embodiments, the systems and methods disclosed herein provide for a scalable high-voltage bus architecture utilizing a common high-voltage rail for powering vehicle systems and/or modules. Independent contactors may be utilized on the opposite rail to selective power high-voltage branches. In further embodiments, a common rail pre-charge circuit may be utilized allowing for independent pre-charging of HV branches and systems and/or modules coupled to the HV bus.

9 Claims, 5 Drawing Sheets

(51) Int. Cl.
*B60L 1/00* (2006.01)
*B60L 3/00* (2006.01)
*B60L 3/04* (2006.01)
*H02J 7/00* (2006.01)
*H01M 2/20* (2006.01)

(52) U.S. Cl.
CPC ..... *B60L 2240/34* (2013.01); *B60L 2240/545* (2013.01); *B60L 2240/547* (2013.01); *B60L 2240/549* (2013.01); *H01M 2220/20* (2013.01); *H02J 2007/0067* (2013.01); *Y02T 10/705* (2013.01); *Y02T 10/7005* (2013.01); *Y02T 10/7044* (2013.01)

(56) References Cited

U.S. PATENT DOCUMENTS

2012/0025768 A1* 2/2012 Nakano ................. B60L 11/005
320/116
2013/0265292 A1* 10/2013 Yang ..................... G09G 3/3696
345/212

FOREIGN PATENT DOCUMENTS

CN 203032410 U * 7/2013 ............. B60L 15/00
CN 203032410 U 7/2013

\* cited by examiner

DISTRIBUTED VEHICLE BATTERY HIGH-VOLTAGE BUS SYSTEMS AND METHODS

TECHNICAL FIELD

This disclosure relates to a bus architecture for a battery system in a vehicle. More specifically, the systems and methods of the present disclosure provide for a distributed high-voltage bus for a battery system included in a vehicle.

BACKGROUND

Passenger vehicles often include electric batteries for operating features of a vehicle's electrical and drivetrain systems. For example, in a hybrid-electric vehicle ("HEV"), a plug-in hybrid electric vehicle ("PHEV"), a fuel cell electric vehicle ("FCEV"), an extended range electric vehicle ("EREV"), or a purely electric vehicle ("EV"), an energy storage system ("ESS") (e.g., a rechargeable ESS) may be used to power electric drivetrain components of the vehicle (e.g., electric drive motors and the like). The ESS may store high-voltage electrical energy, which may be transmitted to vehicle systems via a high-voltage ("HV") bus having positive and negative conductors or rails. An ESS may be selectively coupled to the positive and negative conductors or rails via one or more selectively switched electric contactors. Conventional vehicle architectures utilizing ESSs, however, may not be particularly scalable in their ability to power additional vehicle systems. Moreover, conventional architectures may not allow for independent pre-charging of HV power branches.

SUMMARY

Systems and methods are disclosed herein providing for an ESS architecture that allows for increased scalability of powered vehicle systems (e.g., fast charging systems or the like) while maintaining certain system performance and diagnostic capabilities. In certain embodiments, an ESS architecture is disclosed that utilizes a common HV rail on a HV bus while providing independent HV switching (e.g., via one or more HV contactors) on the opposite rail. A common rail pre-charge circuit may be utilized allowing for independent pre-charging of HV branches coupled to the HV bus. This may allow vehicle systems powered by the HV bus to be energized independently or at the same time.

In certain embodiments, a system may include a vehicle battery system (e.g., a HV ESS or the like). A primary contactor may be included in the system configured to selectively couple a first terminal (e.g., a positive or negative terminal) of the vehicle battery system to a common primary rail. A plurality of vehicle modules may be coupled to the common primary rail. The system may further include a plurality of branch contactors, each branch contactor being associated with at least one vehicle module of the plurality of vehicle modules. Each branch contactor may further be configured to selectively couple an associated vehicle module to a secondary rail coupled to a second terminal of the vehicle battery system different than the first terminal.

In some embodiments, a common rail pre-charge circuit may be employed allowing for independent pre-charging of HV branches coupled to a HV bus comprising the primary and secondary rails. In certain embodiments, the pre-charge circuit may be disposed in parallel with the primary contactor and comprise a pre-charging contactor and pre-charging resistor in a series configuration. The pre-charging circuit may be configured to perform independent pre-charging operations for branches associated with each of the plurality of branch contactors by selectively actuating the primary contactor, the pre-charging contactor, and the plurality of branch contactors.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
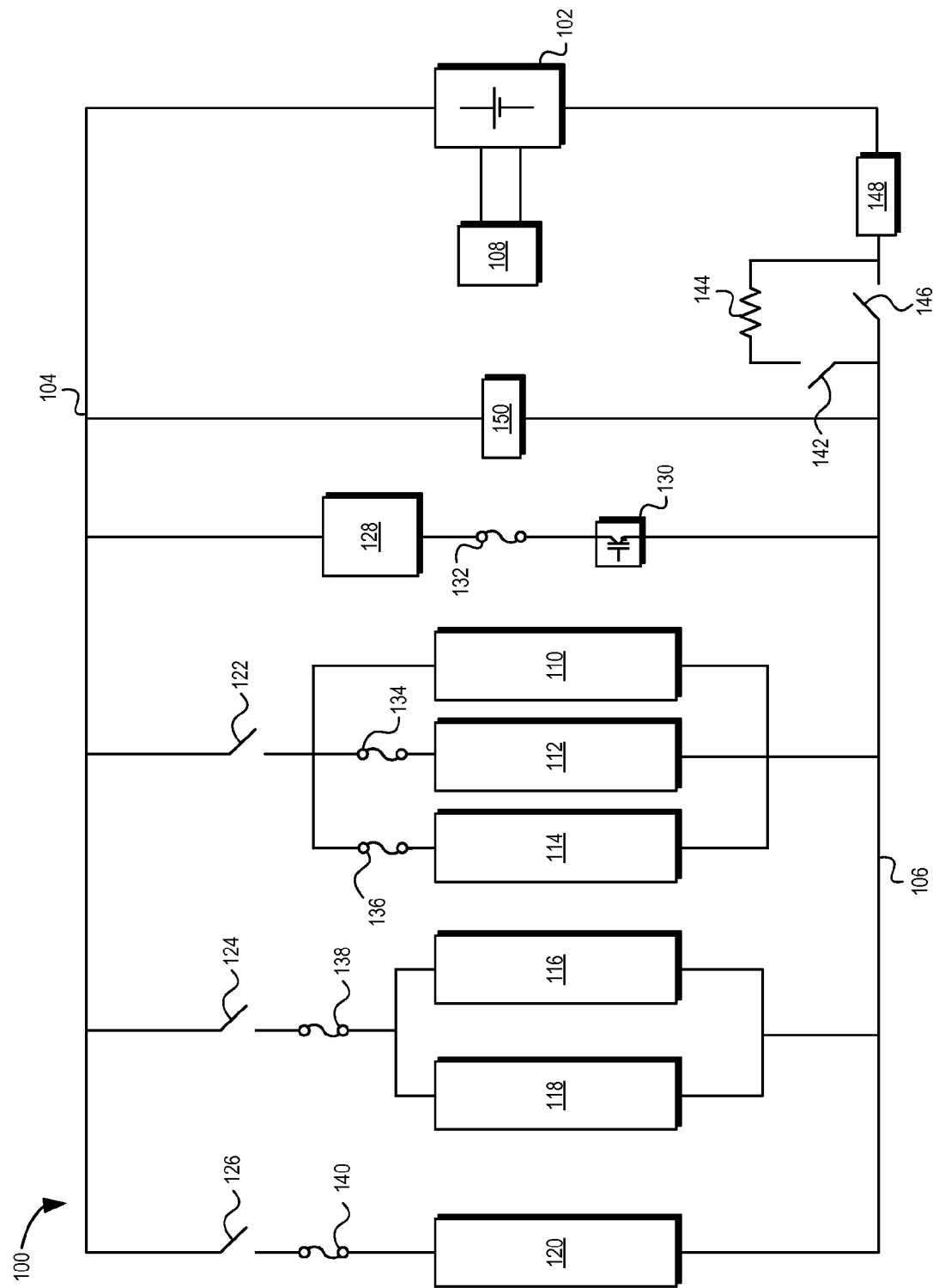
FIG. 1 illustrates an exemplary HV ESS bus architecture having a common secondary rail consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

The systems and methods disclosed herein may provide an ESS architecture that allows for increased scalability of powered vehicle systems while maintaining certain performance and diagnostic capabilities. In certain embodiments, an ESS architecture is disclosed that utilizes a HV bus including a common HV rail for powering vehicle systems and/or modules. Independent HV contactors may be utilized on the opposite rail to selectively power HV branches connected to vehicle systems and/or modules.

In certain embodiments, a common rail pre-charge circuit may be utilized allowing for independent pre-charging of HV branches and systems and/or modules coupled to the HV bus. In some embodiments, the common rail pre-charge circuit may allow systems and/or modules powered by the ESS to be pre-charged independently and/or together depending on a vehicle mode. In further embodiments, the common rail pre-charge circuit may allow for flexible combination of certain inverter/converter modules while reducing redundant relay cycling and vehicle mode switching times.

Certain embodiments of the ESS architecture disclosed herein may provide increased flexibility in scaling the number of HV systems powered by the ESS via the HV bus. For example, in certain embodiments, fast charging systems (e.g., DC fast charging systems) may be added to a vehicle implementing the disclosed ESS architecture with minimal or no additional HV switchgear (e.g., HV contactors, voltage and current sensors, and/or the like). Other HV systems and/or modules may be similarly incorporated into the disclosed ESS architecture. Further embodiments allow for segregation of HV systems and/or modules on a plurality of HV branches coupled to the HV bus.

Figure 2:
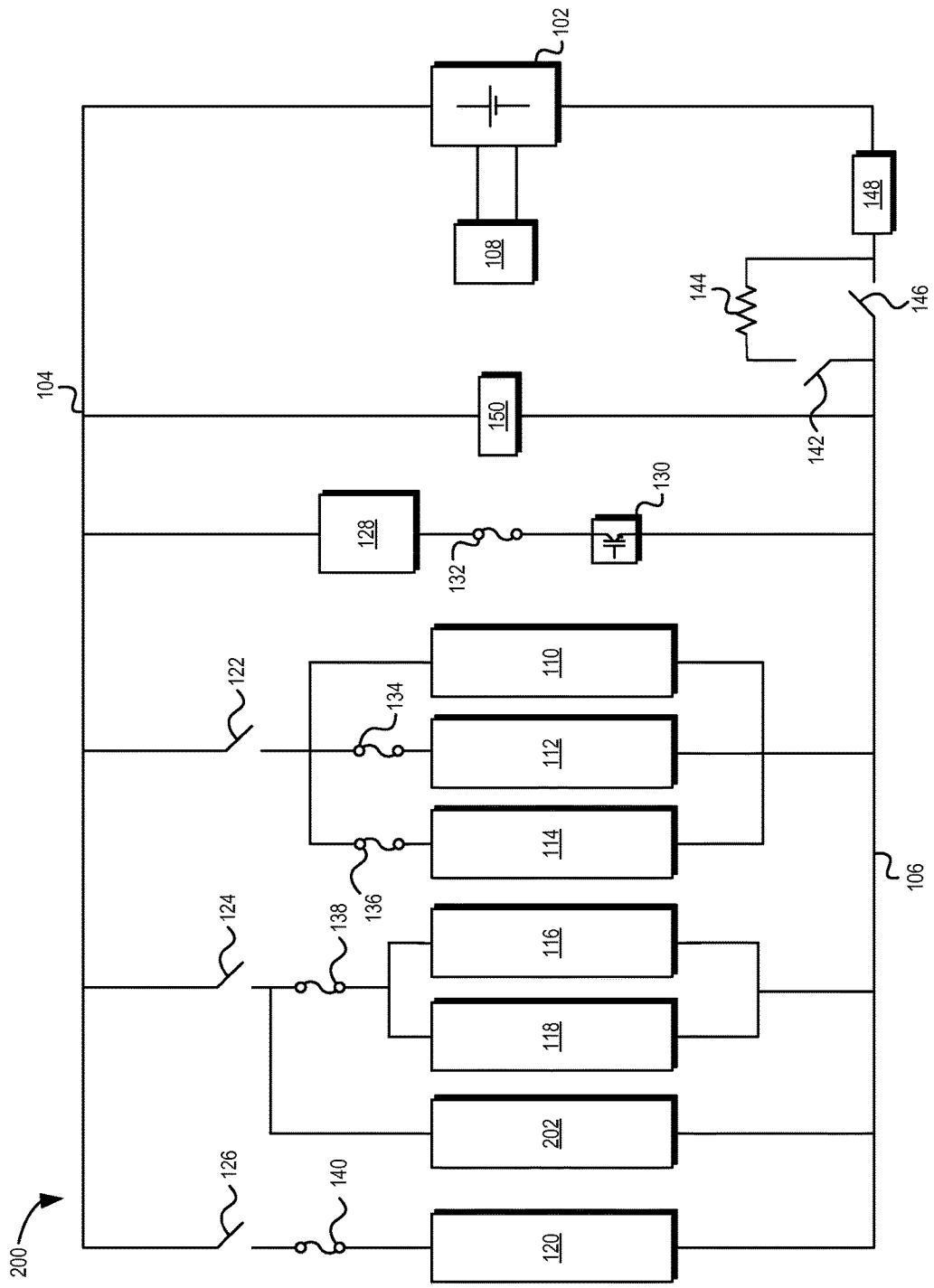
FIG. 2 illustrates an exemplary HV ESS bus architecture having a common secondary rail and including a fast charging system consistent with embodiments disclosed herein.
Figure 3:
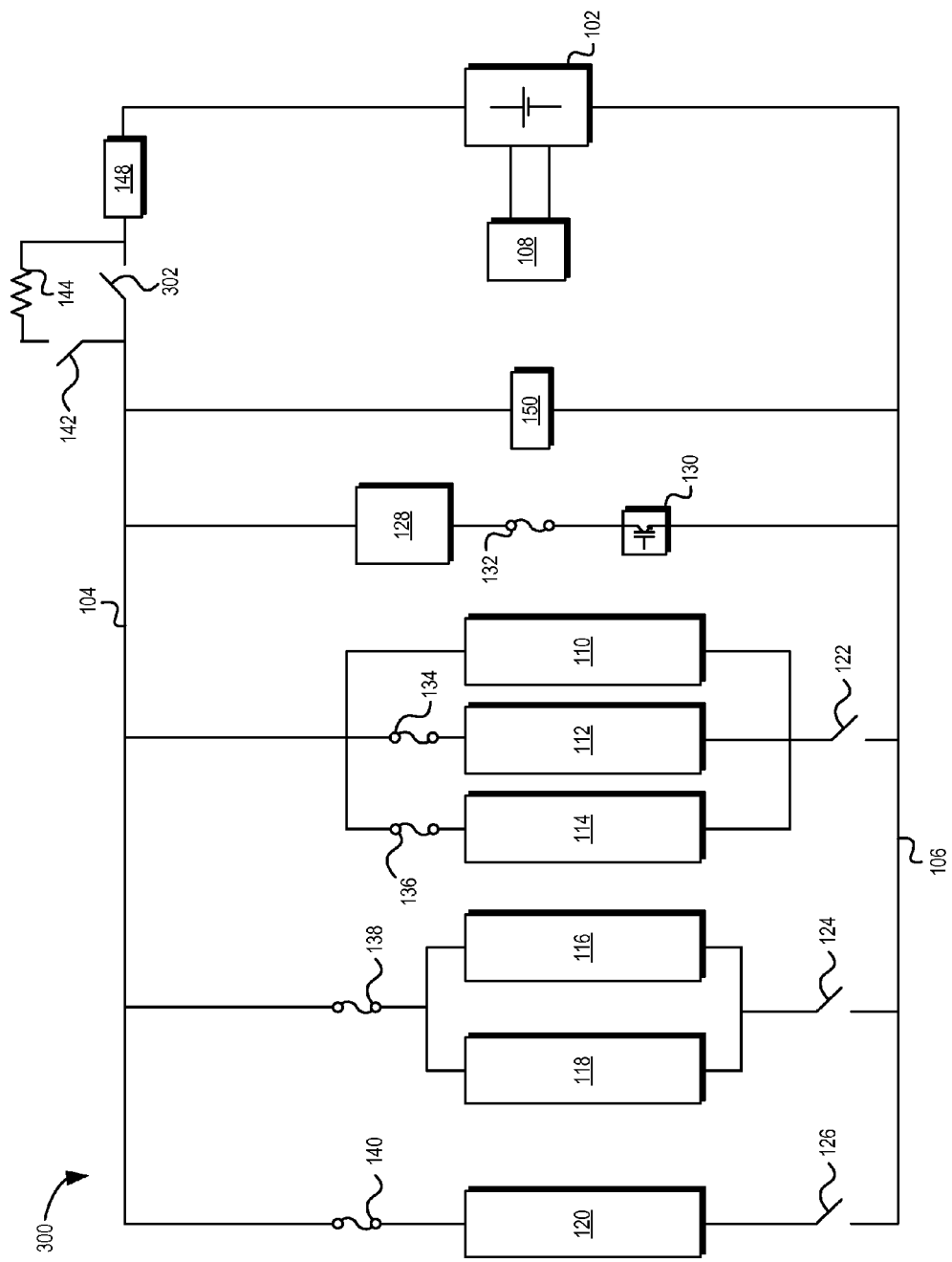
FIG. 3 illustrates an exemplary HV ESS bus architecture having a common primary rail consistent with embodiments disclosed herein.
Figure 4:
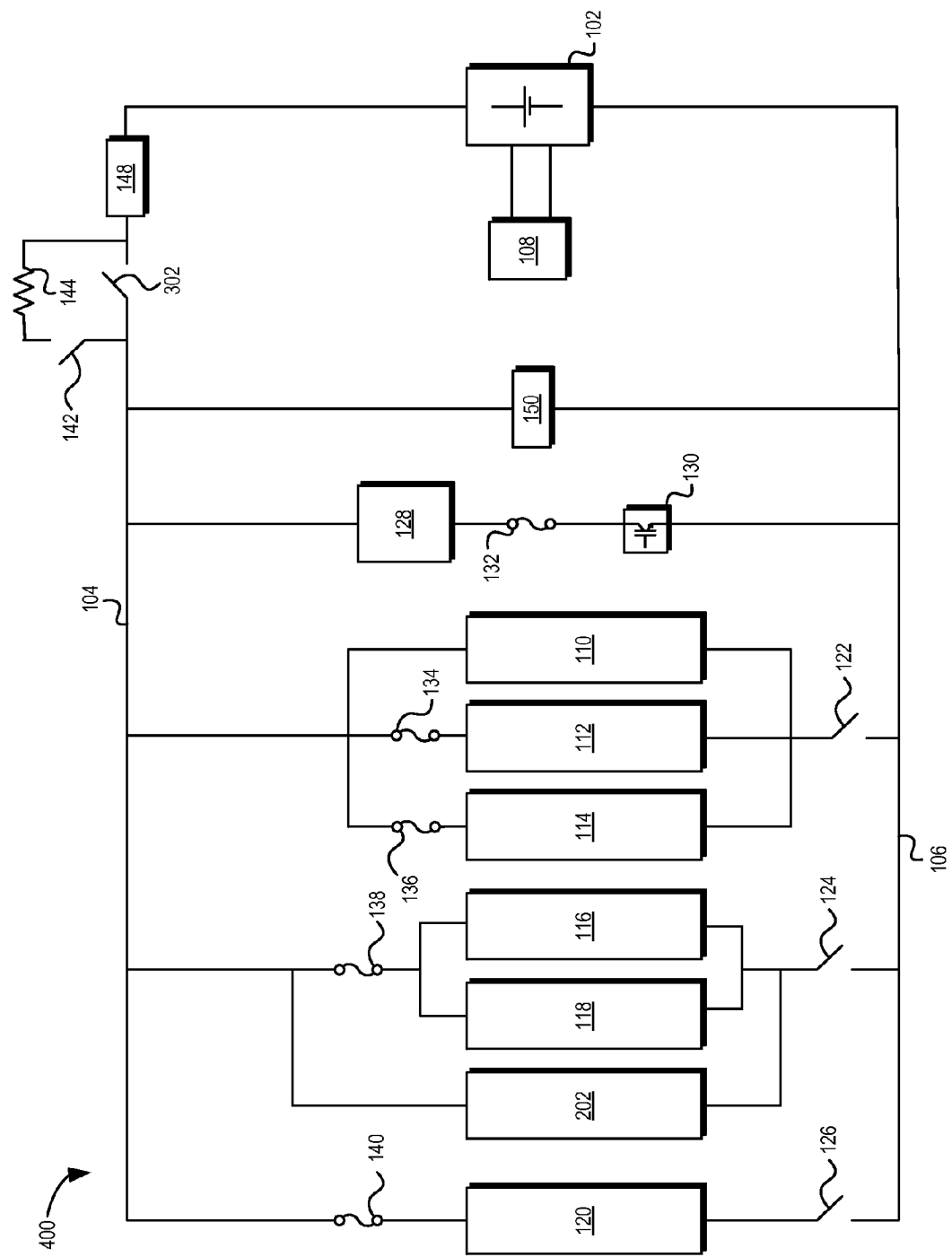
FIG. 4 illustrates an exemplary HV ESS bus architecture having a common primary rail and including a fast charging system consistent with embodiments disclosed herein.

FIGS. 1-4 illustrate exemplary HV ESS bus architectures consistent with embodiments disclosed herein. Particularly, FIGS. 1-2 illustrate an exemplary HV bus architecture having a common secondary rail (e.g., a rail configured to be electrically coupled to a negative terminal of an ESS) and a common secondary contactor. FIGS. 3-4 illustrate an exemplary HV bus architecture having a common primary rail (e.g., a rail configured to be electrically coupled to a positive terminal of an ESS) and a common primary contactor. The embodiments illustrated in FIGS. 1-4 are discussed in more detail below.

FIG. 1 illustrates an exemplary HV ESS bus architecture 100 having a common secondary rail 106 consistent with embodiments disclosed herein. The architecture 100 may include an ESS 102. The ESS 102 may be configured to provide electrical power to one or more systems of an associated vehicle. The vehicle may be a motor vehicle, a marine vehicle, an aircraft, and/or any other type of vehicle, and may include any suitable type of drivetrain for incorporating the systems and methods disclosed herein. For example, in some embodiments, the ESS 102 may be configured to provide electrical power to one or more electric motors (not shown) of a vehicle drivetrain. In further embodiments, the ESS 102 may provide electrical power to one or more other vehicle systems and/or modules 110-120 including, without limitation, vehicle heating and cooling systems, charging systems, and/or auxiliary power systems.

The ESS 102 may include one or more battery packs and/or battery cells (not shown) suitably sized to provide electrical power to vehicle systems utilizing any suitable battery technology or combination thereof. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies. In some embodiments, the ESS 102 may comprise a HV ESS.

The ESS 102 may store HV electrical energy that may be provided to vehicle systems and/or modules 110-120 via a HV bus having primary and secondary conductors or rails 104, 106 (e.g., positive and negative rails). In the illustrated embodiments, the secondary rail 106 may be coupled to a negative terminal of the ESS 102 by a secondary contactor 146. In certain embodiments, the secondary contactor 146 may comprise, for example, a solenoid driven switch, although other suitable HV switching mechanisms are also contemplated. The secondary rail 106 may be a common rail of the HV bus coupled to powered systems 110-120 without any intermediate HV switches and/or contactors (e.g., branch contactors or the like).

The primary rail 104 may be coupled to a positive terminal of the ESS 102. One or more powered systems 110-120 may be selectively coupled to the primary rail 104. For example, one or more powered systems 110-120 may be selectively coupled to the primary rail 104 via one or more branch contactors 122-126. In certain embodiments, branch contactors 122-126 may selectively couple one or more HV branches powering one or more systems and/or modules 110-120 to the HV bus. For example, as illustrated, one branch contactor (e.g., branch contactor 122) may selectively couple a plurality of systems and/or modules (e.g., systems and/or modules 110-114) to the HV bus.

In certain embodiments, the ESS 102 may be coupled to a manual service disconnect ("MSD") 108. When removed from an associated receptacle, the MSD 108 may physically interrupt certain HV lines internal to the ESS 102, thereby disabling the ESS 102. The MSD 108 may be located at a midpoint of the ESS 102 (e.g., a midpoint of a cell stack of the battery system). In further embodiments, the MSD 108 may be located in a suitable location relative to the internal architecture of the ESS 102. In some embodiments, energy stored in the ESS 102 after disconnecting the MSD 108 may be discharged by an external discharging system coupled to an appropriate access point (not shown).

A variety of systems and/or modules 110-120 may be powered by the ESS 102 via the HV bus. For example, as discussed above, the ESS 102 may be configured to power one or more electric motors associated with a vehicle drivetrain. In further embodiments, the ESS 102 may be configured provide electric power to a traction power inverter module ("TPIM") 110, an air conditioning control module ("ACCM") 112, a cabin heater control module ("CHCM") 114, an auxiliary power module ("APM") 116, an on-board charge module ("OBCM") 118, an auxiliary HV bus 120, and/or any other suitable vehicle system and/or module. It will be appreciated that these systems and/or modules are to be viewed as exemplary, and that consistent with embodiments disclosed herein, the ESS 102 may provide HV electrical power to a variety of vehicle systems and/or modules.

In certain embodiments, the ESS 102 may provide electrical power to a heater system 128 selectively coupled to the HV bus by a solid-state relay ("SSR") 130 and/or any other suitable selectively actuated switch disposed in series therewith. Collectively, systems and/or modules (e.g., modules 110-120 and/or heater system 128) powered by the ESS 102 may be described herein as ESS powered equipment ("ESS PE"). In some embodiments, one or more fuses 132-140 may be configured to provide overcurrent protection for ESS PE 110-120 and 128. In certain embodiments, a fuse (e.g., fuse 136) may provide overcurrent protection for a single module (e.g., CHCM 114). In further embodiments, a fuse (e.g., fuse 138) may provide overcurrent protection for a plurality of modules (e.g., APM 116 and OBCM 118).

In some embodiments, the bus architecture 100 may utilize a pre-charging contactor 142 comprising a solenoid driven switch and/or any other suitable switching mechanism during pre-charging operations. When actuated by a pre-charging contactor driver (not shown) based on a pre-charge control signal, the pre-charging contactor 142 may couple a negative terminal of the ESS 102 to the common secondary rail 106 across a pre-charge resistor 144. Although illustrated as contactor, it will be appreciated that the pre-charging contactor 142 may be implemented using any selectively actuated electrical connection including, for example, a SSR or switch. One or more powered systems and/or modules 110-120 undergoing pre-charging operations may be selectively coupled to the primary rail 104 and across the HV bus by selectively actuating one or more of the branch contactors 122-126.

The pre-charge resistor 144 may be suitably sized and/or configured to provide a relatively slow charging of a capacitance of a load (e.g., one or more ESS PE 110-120) coupled across the primary and secondary rails 104, 106 when the pre-charging contactor 142 and one or more of the branch contactors 122-126 are closed and the secondary contactor 146 is open. After the capacitance of a load coupled across the primary and secondary rails 104, 106 reaches a particular level (e.g., a stable level) and/or after a particular period of time, the secondary contactor 146 may be closed and the pre-charging contactor 142 may be opened.

In certain embodiments, a utilizing a pre-charge circuit (i.e., pre-charging contactor 142 and resistor 144) disposed on the common secondary rail 104 may allow for independent pre-charging of HV branches coupled to the HV bus. Accordingly, the systems and methods disclosed herein may allow ESS PE 110-120 to be pre-charged independently and/or together based on a vehicle mode of operation. In certain embodiments, vehicle modes of operation may be associated with certain branches and/or ESS PE (e.g., ESS PE 110-120) being powered during vehicle operation (e.g., a drive system being powered, a ESS PE powered by a certain branch being powered, a fuel cell branch being powered in a PHEV, and/or the like). For example, when the secondary contactor 146 is open and the pre-charging contactor 142 is closed during pre-charging operations, branch contactor 122 may be selectively closed, thereby pre-charging TPIM 110, ACCM 112, and/or CHCM 114. Other ESS PE 110-128 may be similarly pre-charged by selectively actuating one or more branch contactors 122-126 with the secondary contactor 146 open and the pre-charging contactor 142 closed.

Further embodiments disclosed herein may implement a heating only operation and/or mode. In certain embodiments, such a mode may be utilized to prevent current from entering the ESS 102 in extreme cold temperatures and protect the internal chemistry of the ESS 102. During such a mode, pre-charging contactor 142 and secondary contactor 146 may be opened and SSR 130 and branch contactor 124 may be closed, thereby allowing the heater 128 to operate without power from the ESS 102 (e.g., via power provided by the OBCM). A heating mode may be similarly achieved by actuating SRR 130 and another branch contactor to couple the heater 128 to another power source (e.g., an external power source).

In some embodiments, one or more sensors 148-150 may be included in the ESS architecture 100. For example, as illustrated, a current sensor 148 may be configured to monitor an electrical current flow through the common secondary rail 106. A voltage sensor 150 may be configured to measure a voltage across the HV bus between the primary rail 104 and the common secondary rail 106. In certain embodiments, current and/or voltage information measured by sensors 148-150 may be utilized in monitoring and/or controlling the operations of the ESS 102 and/or the HV bus (e.g., monitoring pre-charging operations and/or the like).

FIG. 2 illustrates an exemplary HV ESS bus architecture 200 having a common secondary rail 106 and including a fast charging system 202 consistent with embodiments disclosed herein. Certain elements of the exemplary HV ESS architecture 200 may be similar to those illustrated in and described in reference to FIG. 1 and, accordingly, similar elements may be denoted with like numerals.

Embodiments of the systems and methods disclosed herein may allow for a number of systems and/or modules powered by a HV bus to be scaled based on varying vehicle requirements. For example, as illustrated, the architecture 200 may incorporate a fast charging system 202 (e.g., a DC fast charging system) powered by the ESS 102 via the HV bus configured to perform certain fast charging operations for the vehicle. The fast charging system 202 may be included in the architecture 200 with minimal or no additional HV switchgear (e.g., HV contactors, voltage and current sensors, and/or the like). For example, in some embodiments, an HV-powered system (e.g., fast charging system 202) may be added to the architecture 200 utilizing an existing branch contactor 124 for selective coupling to the primary rail 104. Additional HV-powered systems and/or modules may be similarly incorporated into the disclosed ESS architecture 200.

FIG. 3 illustrates an exemplary HV ESS bus architecture 300 having a common primary rail 104 consistent with embodiments disclosed herein. Certain elements of the exemplary HV ESS 300 may be similar to those illustrated in and described in reference to FIG. 1 and, accordingly, similar elements may be denoted with like numerals. As discussed above, in some embodiments the ESS architecture 300 may incorporate a primary rail 104 as a common HV rail for powering vehicle systems and/or modules 110-120. For example, as illustrated in FIG. 3, the primary rail 104 may be a common rail of the HV bus coupled to ESS PE 110-120 and 128 without any intermediate HV switches and/or contactors (e.g., branch contactors). The primary rail 104 may be selectively coupled to a positive terminal of the ESS 102 by a primary contactor 302. In certain embodiments, the primary contactor 302 may comprise, for example, a solenoid driven switch, although other suitable HV switching mechanisms are also contemplated.

The secondary rail 106 may be coupled to a negative terminal of the ESS 102. One or more powered systems 110-120 may be selectively coupled to the secondary rail 106. For example, one or more powered systems 110-120 may be selectively coupled to the secondary rail 106 via one or more branch contactors 122-126. In certain embodiments, branch contactors 122-126 may selectively couple one or more HV branches powering one or more systems and/or modules 110-120 to the HV bus. In some embodiments, independent branch contactors 122-126 may be utilized to selectively couple HV branches and associated vehicle systems and/or modules 110-120 to the HV bus.

In some embodiments, the bus architecture 300 may utilize a pre-charging contactor 142 comprising a solenoid driven switch and/or any other suitable switching mechanism during pre-charging operations. When actuated by a pre-charging contactor driver (not shown) based on a pre-charge control signal, the pre-charging contactor 142 may couple a positive terminal of the ESS 102 to the common positive rail 104 across a pre-charge resistor 144. One or more powered systems and/or modules 110-120 undergoing pre-charging operations may be selectively coupled to the secondary rail 106 and across the HV bus by selectively actuating one or more of the branch contactors 122-126.

FIG. 4 illustrates an exemplary HV ESS bus architecture 400 having a common primary rail 104 and including a fast charging system 202 consistent with embodiments disclosed herein. Certain elements of the exemplary HV ESS architecture 400 may be similar to those illustrated in and described in reference to FIGS. 1-3 and, accordingly, similar elements may be denoted with like numerals.

Embodiments of the systems and methods disclosed herein may allow for a number of systems and/or modules powered by a HV bus to be scaled based on varying vehicle requirements. For example, as illustrated, the architecture 400 may incorporate a fast charging system 202 (e.g., a DC fast charging system) powered by the ESS 102 via the HV bus configured to perform certain fast charging operations for a vehicle. Additional HV-powered systems and/or modules may be similarly incorporated into the disclosed ESS architecture 400.

In certain embodiments, the systems and methods disclosed herein may provide for less complex diagnostic capabilities of an ESS HV bus and/or associated components. In some embodiments, conditions of all switchgear (e.g., switches, relays, and/or contactors) may be determined. One or more preset diagnostic modes may be utilized in diagnosing conditions of the ESS HV bus and/or associated components. In certain embodiments, conditions of an ESS HV bus and/or associated components may be represented as a binary bit string having a plurality of bits. For example, in some embodiments, a 4-bit binary string may be utilized having the following bit position map:

[0 0 0 0]→[Charger Contactor|Primary Contactor-|Pre-charge Contactor|Secondary Contactor]

where 0 indicates a de-energized switch, relay, and/or contactor (i.e., closed) and 1 indicates an energized switch, relay, and/or contactor (i.e., open).

Table 1, provided below, illustrates exemplary diagnostic bit strings and associated state conditions of an ESS HV bus and/or associated components consistent with embodiments disclosed herein.

TABLE 1

| Diagnostic Bit String | ESS HV Bus Conditions |
|---|---|
| [1 0 0 1] | Charger bus open |
| [0 1 1 0] | Pre-charger contactor stuck open |
| [1 0 0 0] | Charger contactor stuck open |
| [0 1 0 0] | Primary contactor stuck open |
| [1 1 0 1] | Vehicle drivetrain bus open; secondary contactor stuck open |
| [0 0 0 0] | Primary contactor stuck closed; secondary contactor stuck closed; charger bus discharge failure; vehicle drivetrain bus discharge |
| [1 1 1 0] | Charger bus shorted; vehicle drivetrain bus shorted; charger bus pre-charge too long; vehicle drivetrain bus pre-charge too long |

It will be appreciated that the above diagnostic codes and associated state conditions are to be viewed as exemplary, and that consistent with embodiments disclosed herein, diagnostics of the ESS HV bus and/or associated components may utilize a variety of suitable diagnostic codes and/or associated state conditions. Diagnostic codes and associated state conditions may, among other things, be utilized in notifying vehicle operators and/or service technicians of vehicle status and/or whether a vehicle should be serviced (e.g., via a malfunction indicator light and/or the like).

In certain embodiments, the state conditions provided in Table 1 may be identified based on performing one or more diagnostic tests. Table 2, provided below, provides exemplary diagnostic tests associated with state conditions provided in Table 1 consistent with embodiments disclosed herein.

TABLE 2

| ESS HV Bus Conditions | Associated Diagnostic Test |
|---|---|
| Charger bus open | If during charging, the charger bus voltage does not equal the ESS voltage for a specified duration of time, it may be inferred that the HV charger bus is open. Under such a condition, the vehicle may not be allowed to charge and will be allowed to continue to operate until an associated 12 V battery is drained. |
| Pre-charger contactor stuck open | Upon a pre-charge contactor being commanded closed and a heater SSR being open, if a negative chassis voltage (e.g., a common rail voltage) is less than a specified value within a specified amount of time, it may be inferred that the pre-charge contactor is stuck open. Under such conditions, the vehicle may not be operable. |
| Charger contactor stuck open | If charger contactor and pre-charge contactor are commanded closed and the charger bus voltage does not reach 95% of battery voltage, it may be inferred that the charger relay is stuck open. Under such conditions, the vehicle may not be allowed to charge and will be allowed to continue to operate until an associated 12 V battery is drained. |
| Primary contactor stuck open | After pre-charging is complete and the primary contactor is commanded closed and the pre-charge contactor is commanded open, if the bus voltage begins to drop, it may be inferred that the primary contactor is stuck open. Under such conditions, the vehicle may not be operable. |
| Vehicle drivetrain bus open | If during propulsion or active cooling, the drivetrain bus voltage does not equal battery voltage for a specified duration of time, it may be inferred that the HV vehicle drivetrain bus is open. Under such conditions, the vehicle may not be propulsion capable but may be able to charge. |
| Secondary contactor stuck open | Upon the secondary contactor being commanded closed, if the positive to chassis voltage (e.g., on the drivetrain bus) does not rise above a specified threshold, the secondary relay may be inferred to be stuck open. Under such conditions, the vehicle may not be propulsion capable but may be able to charge. |
| Primary contactor stuck closed | When contactors are commanded open, if the negative to chassis voltage (e.g., on the drivetrain bus) is above a specified threshold, it may be inferred that the relay is stuck closed. |

TABLE 2-continued

| ESS HV Bus Conditions | Associated Diagnostic Test |
| --- | --- |
| Secondary contactor stuck closed | When the secondary (e.g., propulsion relay) relay is commanded open and the positive to chassis voltage (e.g., on the drive train bus) is greater than a specified value it, may be inferred that the relay is stuck open. |
| Charger bus discharge failure | Upon commanding the charger contactor and primary contactor open, if the charger bus voltage does not fall below a specified threshold within a specified amount of time, it may be inferred both charger & primary contactors are stuck closed and a discharge fault will set. Under such conditions, vehicle and charging operations may be not be permitted by a HV safety system. |
| Vehicle drivetrain bus discharge | Upon commanding the secondary contactor and primary relay contactor, if the vehicle drivetrain bus voltage does not fall below a specified threshold within a specified amount of time it may be inferred that the secondary and primary relays are stuck closed and a vehicle drivetrain discharge fault will set. Under such conditions, vehicle operations may be not be permitted by a HV safety system. |
| Charger bus shorted | Upon charger and pre-charge contactors being commanded closed, if the ESS current is above a specified threshold, it may be inferred the charger bus is shorted. Under such conditions, vehicle propulsion may be allowed until an associated 12 V battery is drained but the vehicle will not be permitted to charge. |
| Vehicle drivetrain bus shorted | Upon secondary relay and pre-charge contactors being commanded closed, if the battery current is above a specified threshold, it may be inferred the vehicle drivetrain bus is shorted. Under such conditions the vehicle may not be propulsion capable but may be charging capable. |
| Charger bus pre-charge too long | When the charger and pre-charge contactors have been commanded closed, but the voltage does not reach 95% of ESS voltage within a specified time period, this diagnostic may be set. Under such conditions, vehicle propulsion may be allowed until an associated 12 V battery is drained but the vehicle will not be permitted to charge. |
| Vehicle drivetrain bus pre-charge too long | Upon the secondary relay and pre-charge contactors being commanded closed, if the vehicle drivetrain bus voltage does not reach 95% of ESS voltage within a specified amount of time, it can be inferred the bus is open, and this diagnostic may be set. Under such conditions the vehicle may not be propulsion capable but may be charging capable. |

Figure 5:
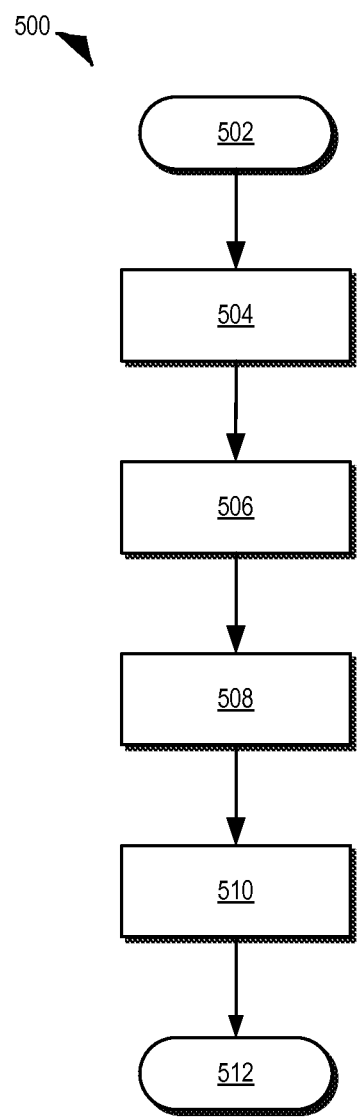
FIG. 5 illustrates a flow chart of an exemplary method for pre-charging a HV branch using a common rail pre-charge circuit consistent with embodiments disclosed herein.

FIG. 5 illustrates a flow chart of an exemplary method 500 for pre-charging a HV branch using a common rail pre-charge circuit consistent with embodiments disclosed herein. In certain embodiments, the illustrated method 500 may be performed using, at least in part, a primary and/or secondary contactor associated with a common rail, a pre-charging circuit associated with the common rail, and/or one or more branch contactors. In further embodiments, any other suitable system or systems may be utilized.

At 502, the method may be initiated. At 504, a primary contactor may be opened. The primary contactor may be configured to selectively couple a first terminal (e.g., positive or negative) of a vehicle battery system to a common primary rail. At 506, a branch contactor of a plurality of branch contactors may be closed to selectively couple an associated vehicle module of a plurality of vehicle modules to a secondary rail coupled to a second terminal of the vehicle battery system. At 508, a pre-charging contactor included in a pre-charging circuit may be closed to couple the first terminal to the common primary rail across the pre-charging contactor and a pre-charging resistor disposed in series therewith. At 510, a determination may be made that the vehicle module has been pre-charged. If the vehicle module has been pre-charged, the primary contactor may be closed while the pre-charging contactor may be opened, thereby coupling the vehicle module to the first terminal of the battery system via the common primary rail and primary contactor. At 512, the method may terminate.

Although the foregoing has been described in some detail for purposes of clarity, it will be apparent that certain changes and modifications may be made without departing from the principles thereof. Certain features of the embodiments disclosed herein may be configured and/or combined in any suitable configuration or combination. Additionally, certain systems and/or methods disclosed herein may be utilized in battery systems and/or ESS systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. Various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
   a vehicle battery system;
   a primary contactor configured to selectively couple a positive terminal of the vehicle battery system to a common primary rail;
   a pre-charging circuit disposed in parallel with the primary contactor comprising a pre-charging contactor and a pre-charging resistor disposed in series;
   a plurality of vehicle modules coupled to the common primary rail; and
   a plurality of branch contactors, each branch contactor being associated with at least one vehicle module of the plurality of vehicle modules and being configured to selectively couple an associated vehicle module to a secondary rail coupled to a negative terminal of the vehicle battery system,
   wherein the pre-charging circuit is configured to perform independent pre-charging operations for branches associated with each of the plurality of branch contactors by selectively actuating the primary contactor, the pre-charging contactor, and the plurality of branch contactors.

2. The system of claim 1, wherein the vehicle battery system is configured to provide electrical power to an electric motor of the vehicle.

3. The system of claim 1, wherein the plurality of vehicle modules comprise at least one of a traction power inverter module, an air conditioning control module, a cabin heater control module, an auxiliary power module, a heater system, a fast charging system, an onboard charge module, and an auxiliary high-voltage bus.

4. The system of claim 1, wherein the vehicle battery system comprises a high voltage battery system.

5. The system of claim 1, wherein at least one branch contactor is associated with more than one vehicle module of the plurality of vehicle modules.

6. A method comprising:
   opening a primary contactor, the primary contactor being configured to selectively couple a first terminal of a vehicle battery system to a common primary rail;
   closing a pre-charging contactor included in a pre-charging circuit to couple the first terminal to the common primary rail across the pre-charging circuit, the pre-charging circuit disposed in parallel with the primary contactor comprising the pre-charging contactor and the pre-charging resistor disposed in series;
   closing a branch contactor of a plurality of branch contactors to selectively couple an associated vehicle module of a plurality of vehicle modules to a secondary rail coupled to second terminal of the vehicle battery system; and
      wherein the pre-charging circuit is configured to perform independent pre-charging operations for branches associated with each of the plurality of branch contactors by selectively actuating the primary contactor, the pre-charging contactor, and the plurality of branch contactors.

7. The method of claim 6 further comprising:
   determining that the vehicle module has been pre-charged; and
   in response to determining that the vehicle module has been pre-charged, closing the primary contactor and opening the pre-charging contactor.

8. The method of claim 7, wherein determining that the vehicle module has been pre-charged comprises determining that a capacitance of the vehicle module has reached a particular threshold.

9. The method of claim 7, wherein determining that the vehicle module has been pre-charged comprises determining that a particular time period has elapsed.

* * * * *